United States Patent
Hikimura et al.

(10) Patent No.: US 9,996,276 B2
(45) Date of Patent: Jun. 12, 2018

(54) MEMORY SYSTEM, MEMORY CONTROLLER AND CONTROL DEVICE

(71) Applicant: Toshiba Memory Corporation, Minato-ku (JP)

(72) Inventors: Akira Hikimura, Yokohama (JP); Takayuki Tamura, Fuchu (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 159 days.

(21) Appl. No.: 14/741,628

(22) Filed: Jun. 17, 2015

(65) Prior Publication Data

US 2016/0259575 A1    Sep. 8, 2016

Related U.S. Application Data (60) Provisional application No. 62/127,971, filed on Mar. 4, 2015.

(51) Int. Cl.
*G06F 12/10* (2016.01)
*G06F 3/06* (2006.01)

(52) U.S. Cl.
CPC .......... *G06F 3/0616* (2013.01); *G06F 3/0653* (2013.01); *G06F 3/0659* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 7,516,344 B2 | 4/2009 | Kato et al. | |
| 2006/0195708 A1* | 8/2006 | Kato | G06F 1/206 713/300 |
| 2010/0332741 A1* | 12/2010 | Cornwell | G06F 12/0607 711/103 |
| 2011/0109372 A1* | 5/2011 | Zanardi | G01K 3/10 327/512 |
| 2013/0151745 A1* | 6/2013 | Yin | G06F 1/189 710/301 |
| 2014/0281311 A1* | 9/2014 | Walker | G06F 3/0631 711/162 |

FOREIGN PATENT DOCUMENTS

| | | |
|---|---|---|
| JP | 2003-157203 | 5/2003 |
| JP | 2006-209525 | 8/2006 |
| JP | 2012-18648 | 1/2012 |

OTHER PUBLICATIONS

Definition of Gradient, 2017, Google search.*

* cited by examiner

*Primary Examiner* — Duc Doan
(74) *Attorney, Agent, or Firm* — Oblon, McClelland, Maier & Neustadt, L.L.P.

(57) ABSTRACT

According to one embodiment, a memory system includes, as an example, a temperature information receiver that receives temperature information; and a gradient determining unit that determines a gradient related to a temperature increase, based on the temperature information about a plurality of temperatures received by the temperature information receiver.

20 Claims, 7 Drawing Sheets

MEMORY SYSTEM, MEMORY CONTROLLER AND CONTROL DEVICE

CROSS-REFERENCE TO RELATED APPLICATIONS

This application is based upon and claims the benefit of priority from U.S. Provisional Application No. 62/127,971, filed on Mar. 4, 2015; the entire contents of which are incorporated herein by reference.

FIELD

Embodiments described herein relate generally to a memory system, a memory controller, and a control device.

BACKGROUND

Conventionally, there is disclosed a technique in which whether the temperature of a memory system exceeds a preset threshold is monitored, and when the temperature exceeds the threshold, memory access is performed while suppressing the temperature increase.

However, in the case of performing memory access while suppressing the temperature increase when the temperature of the memory system exceeds the preset threshold, like conventional art, even in a case in which the temperature suddenly increases, memory access is continuously performed. Hence, according to conventional art, system operation may fail due to a sudden temperature increase and accordingly data may be corrupted.

DETAILED DESCRIPTION

In general, according to one embodiment, a memory system includes, as an example, a semiconductor memory; a memory controller that controls writing and reading of information to/from the semiconductor memory; a temperature information receiver that is receives temperature information, the temperature information receiver being provided in the memory controller; and a gradient determining unit that is determines a gradient related to a temperature increase, based on the temperature information received by the temperature information receiver, the temperature information relating to a plurality of temperatures, the gradient determining unit being provided in the memory controller.

Exemplary embodiments of a memory system, a memory controller, and a control device will be explained below in detail with reference to the accompanying drawings. The present invention is not limited to the following embodiments.

First Embodiment

The configurations of a memory system, a memory controller, and a control device according to a first embodiment will be explained using the drawings.

Figure 1:
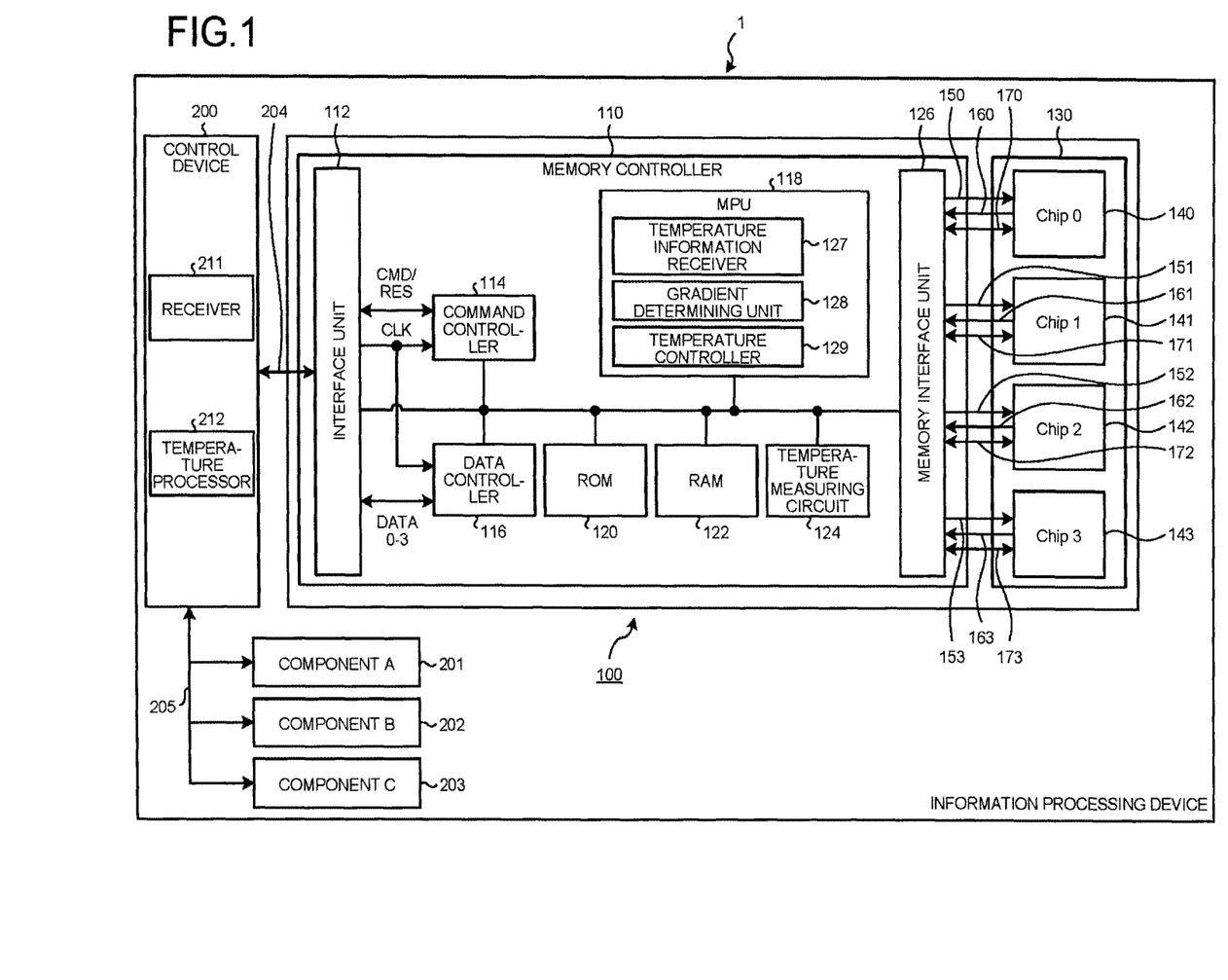
FIG. 1 is a configuration diagram illustrating a configuration of an information processing device according to a first embodiment.

FIG. 1 is a configuration diagram illustrating a configuration of an information processing device 1 according to the first embodiment. The information processing device 1 is, for example, a so-called personal computer, etc.

As illustrated in FIG. 1, the information processing device 1 includes a control device 200 that performs overall control of the entire device. More specifically, the control device 200 is a computer composed of a CPU (Central Processing Unit); a ROM (Read Only Memory) that stores various types of information such as various types of programs and data; a RAM (Random Access Memory) which is a main storage device; a flash memory which is a nonvolatile memory which is a nonvolatile area; an RTC (Real Time Clock) that keeps the current date and time; and the like.

The control device 200 is connected to a semiconductor memory system (hereinafter, also referred to as the "memory system") 100 through a bus 204. The memory system 100 forms, for example, an SSD (Solid State Drive). The memory system 100 stores various types of information such as various types of programs executed by the control device 200 and various types of data. In addition, as illustrated in FIG. 1, the control device 200 allows a component A 201, a component B 202, and a component C 203 to be connected thereto through a bus 205. The component A 201, the component B 202, and the component C 203 are, for example, various types of integrated circuits. In addition, though not particularly illustrated, an operating unit used to perform operation input, a display unit that displays various types of information, a communication I/F (interface) that can be connected to a network, and the like, are connected to the control device 200.

As illustrated in FIG. 1, the memory system 100 includes a semiconductor memory (hereinafter, also referred to as the "memory unit") 130 that stores various types of information such as programs executed by the control device 200 and data; and a semiconductor memory controller (hereinafter, also referred to as the "memory controller" or "controller") 110 that controls writing and reading of data to/from the memory unit 130. The memory system 100 has a substrate which is not illustrated. The memory system 100 has the memory controller 110 and the memory unit 130 mounted on the substrate.

In addition to the memory unit 130 and the memory controller 110, the memory system 100 also has a DRAM and a power circuit which are not illustrated, mounted on the substrate. Note that, in the memory system 100 of the present embodiment, for a reduction in the size of the SSD, the memory unit 130 is mounted on a first main surface (front surface) of the substrate, and the most part of the memory controller 110 is mounted on a second main surface (back surface) of the substrate. In the case of such an embodiment, the main part of the memory controller 110 which is a heat source and the main part of the memory unit 130 which is also a heat source are mounted separately on both surfaces of the substrate, and thus, the heat dissipation effect is excellent.

Note that the mounting of the memory unit 130 and the memory controller 110 is not limited thereto, and each of the main parts of the memory controller 110 and the memory unit 130 may be mounted on one surface of the substrate.

As illustrated in FIG. 1, the memory unit 130 is composed of four chips, a chip0 (140), a chip1 (141), a chip2 (142), and a chip3 (143), which form a NAND flash memory. Each of the chip0 to the chip3 is configured to be able to electrically give and receive signals.

The NAND flash memory can save various types of information such as programs, e.g., an OS (Operating System), and data generated based on the execution of user software, in a readable and writable manner for long periods of time. Hence, the memory system 100 can be used as a boot drive of the information processing device 1.

As illustrated in FIG. 1, the memory controller 110 includes an interface unit 112, a command controller 114, a data controller 116, an MPU (Micro Processing Unit) 118, a ROM (Read Only Memory) 120, a RAM (Random Access Memory) 122, a temperature measuring circuit 124, and a memory interface unit 126.

In addition, the memory controller 110 may include a second temperature measuring circuit which is not illustrate, in addition to the temperature measuring circuit 124. The second temperature measuring circuit is mounted on the first main surface (front surface) of the substrate where the memory unit 130 is mounted, and is configured to be able to input to the MPU 118. By thus providing the temperature measuring circuits (the temperature measuring circuit 124 and the second temperature measuring circuit) on both surfaces of the substrate where the heat sources are mounted, more accurate temperature information can be grasped.

Note that, when each of the main parts of the memory controller 110 and the memory unit 130 is mounted on one surface of the substrate, the temperature measuring circuit 124 may be provided within the memory controller 110 so as to be close to the memory unit 130. Note also that, when the temperature measuring circuit 124 is provided external to the memory controller 110, the configuration may be such that one temperature measuring circuit 124 is provided between the memory controller 110 and the memory unit 130.

The interface unit 112 performs an interface process between the memory controller 110 and the control device 200. Specifically, under the control of the MPU 118, the interface unit 112 performs transmission and reception of commands or data, etc., according to a predetermined protocol. The memory system 100 includes a connector which is not illustrated, and exchanges data, etc., with the control device 200 through the connector.

The command controller 114 receives a command CMD transmitted from the control device 200 and decodes the command CMD. In addition, the command controller 114 generates a response RES which is a response signal to the command CMD, and transmits the response RES to the control device 200.

The data controller 116 performs transmission and reception of data, based on the command CMD transmitted from the control device 200. In addition, the data controller 116 generates status data indicating the operating state of the memory system 100, and transmits the status data to the control device 200.

The MPU 118 controls the overall operation of the memory system 100. For example, when the memory system 100 receives power supply, the MPU 118 reads firmware and system information which are stored in the ROM 120 or the memory unit 130 into the RAM 122 to perform a predetermined process, and thereby creates various types of tables in the RAM 122. The system information includes first temperature threshold data T1 and second temperature threshold data T2 which will be described later and which are used to determine a temperature gradient. Note that the relationship between the first temperature threshold data T1 and the second temperature threshold data T2 is as follows.

First temperature threshold data T1<Second temperature threshold data T2

In addition, a counter C for temperature gradient determination which will be described later is also created in the RAM 122.

Note that although in the present embodiment a temperature gradient is determined using two-level thresholds of the first temperature threshold data T1 and the second temperature threshold data T2, the configuration is not limited thereto. As long as the manner in which the temperature increases can be detected, there may be temperature settings for a plurality of temperatures of two or more levels.

Furthermore, a control program disclosed in the present embodiment can also be stored in the ROM 120 or the memory unit 130. By reading the control program, the MPU 118 is also allowed to have the functions of a temperature information receiver 127, a gradient determining unit 128, and a temperature controller 129, as will be described later.

In addition, the MPU 118 performs a predetermined process on the memory unit 130 based on a write command, a read command, an erase command, or the like, which is outputted from the control device 200, or controls a data transfer process through a buffer which is not illustrated. For example, upon writing of data, a write instruction is issued to the memory interface unit 126.

The ROM 120 stores firmware, etc., which are executed by the MPU 118.

The RAM 122 is used as a working area of the MPU 118, and stores firmware and various types of tables.

The memory interface unit 126 performs an interface process between the memory controller 110 and the memory unit 130.

The temperature measuring circuit (the temperature measuring circuit 124, the second temperature measuring circuit) is provided to be close to the memory unit 130 or the memory controller 110 or provided within the memory controller 110, in order to measure the ambient temperature of the memory unit 130 or the memory controller 110 which is a heat source. Note that, when the temperature measuring circuit (the temperature measuring circuit 124, the second temperature measuring circuit) is provided within the memory controller 110, the temperature measuring circuit is disposed near a portion that is likely to become a heat source. The temperature measuring circuit (the temperature measuring circuit 124, the second temperature measuring circuit) is a semiconductor temperature sensor that utilizes a characteristic that the voltage at a PN junction of a semiconductor changes by temperature. Note, however, that it is also possible to use temperature sensors of other schemes such as a thermistor, instead of the temperature measuring circuit.

In addition, the memory controller 110 is provided with a buffer which is not illustrated. The buffer temporarily stores a fixed amount of data (e.g., an amount corresponding to one page) when data which is transmitted from the control device 200 is written to the memory unit 130. In addition, the buffer temporarily stores a fixed amount of data when data which is read from the memory unit 130 is outputted to the control device 200.

The memory unit 130 includes the four chips 140, 141, 142, and 143. The memory controller 110 is connected to the chip0 (140) of the memory unit 130 by a selection signal line 150, a Ready/Busy signal line 160, and a memory data bus 170 of, for example, 8 bits. In addition, the memory controller 110 is connected to the chip1 (141) of the memory unit 130 by a memory data bus 171, a selection signal line 151, and a Ready/Busy signal line 161. Likewise, the chip2 (142) and the chip3 (143) are also connected to the memory controller 110 by memory data buses 172 and 173, selection signal lines 152 and 153, and Ready/Busy signal lines 162 and 163, respectively. The selection signal lines 150 to 153 are used to transmit selection signals to the chips 140 to 143, respectively. In addition, the Ready/Busy signal lines 160 to 163 are used to monitor the states (Busy or Ready) of the chips 140 to 143, respectively.

As such, the memory controller 110 and the plurality of chips 140 to 143 are directly connected to each other using the memory data buses 170 and 173. Hence, the memory controller 110 can perform parallel control where the memory controller 110 simultaneously accesses the chips 140 to 143. In the present embodiment, the chips 140 to 143 are present for the respective memory data buses 170 to 173 which are used to exchange signals with the memory controller 110. Therefore, the different chips 170 to 173 exchange signals with the memory controller 110 using the memory data buses 170 to 173, at least some (all in this embodiment) of which differ from each other.

In this case, for example, signals, etc., are exchanged through the memory data bus 170, the selection signal line 150, and the Ready/Busy signal line 160 which are connected to the chip0 (140). Likewise, each of the chip1 to the chip3 exchanges signals, etc., with the memory controller 110, using a memory data bus, a Ready/Busy line, and a selection signal line which are connected to the chip.

Note that although in FIG. 1 the four memory data buses 170 to 173, selection signal lines 150 to 153, and Ready/Busy signal lines 160 to 163 each are connected to the memory interface unit 126, at least some may be connected as a common bus to the memory interface unit 126, from the middle.

Figure 2:
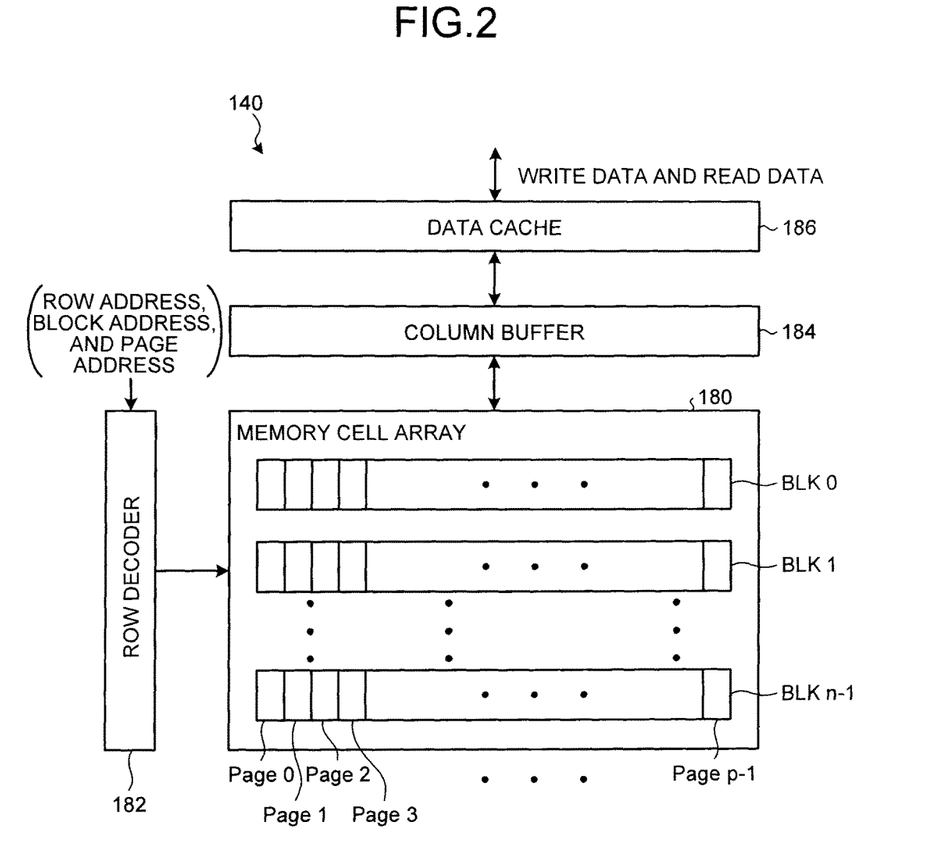
FIG. 2 is a diagram schematically illustrating an internal configuration of a chip according to the first embodiment.

FIG. 2 is a diagram schematically illustrating an internal configuration of the chip0 (140). Note that the chip1 to the chip3 also have the same configuration. As illustrated in the drawing, the chip0 includes a memory cell array 180, a row decoder 182, a column buffer 184 (page buffer), and a data cache 186. The memory cell array 180 includes, for example, 32 memory cell blocks BLK. Each memory cell block BLK is composed of a plurality of pages (page0 to pagep−1, p is a natural number). Here, a page is a unit of data write and is composed of a plurality of memory cells. In addition, a block is a unit of memory erase.

The row decoder 182 receives a row address from the memory controller 110 and decodes the row address. The row address includes a block address that specifies any one of the memory cell blocks BLK; and a page address that specifies any one of the pages. Then, the row decoder 182 selects any one of the pages in any one of the memory cell blocks BLK, based on the row address.

The data cache 186 is a RAM and can temporarily hold data of one page size or less in byte units. The data cache 186 gives and receives data to/from the memory controller 110. Specifically, upon reading data, the data cache 186 transfers data provided from the column buffer 184, to the memory controller 110. Upon writing, the data cache 186 receives data provided from the memory controller 110 and transfers the received data to the column buffer 184 in page units.

The column buffer 184 can temporarily hold data of a page size. Upon reading of data, the column buffer 184 temporarily holds data that is read in page units from the memory cell array 180, and transfers the held data to the data cache 186. In addition, upon writing, data transferred from the data cache 186 is transferred to bit lines BL0 to BLn which are not illustrated, and writing (programming) of the data in page units is performed.

Figure 3:
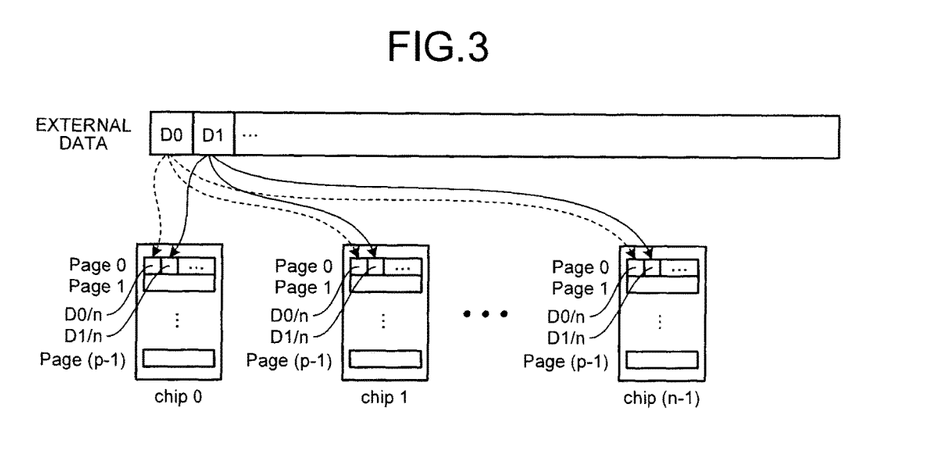
FIG. 3 is a conceptual diagram illustrating parallel control according to the first embodiment.
Figure 4:
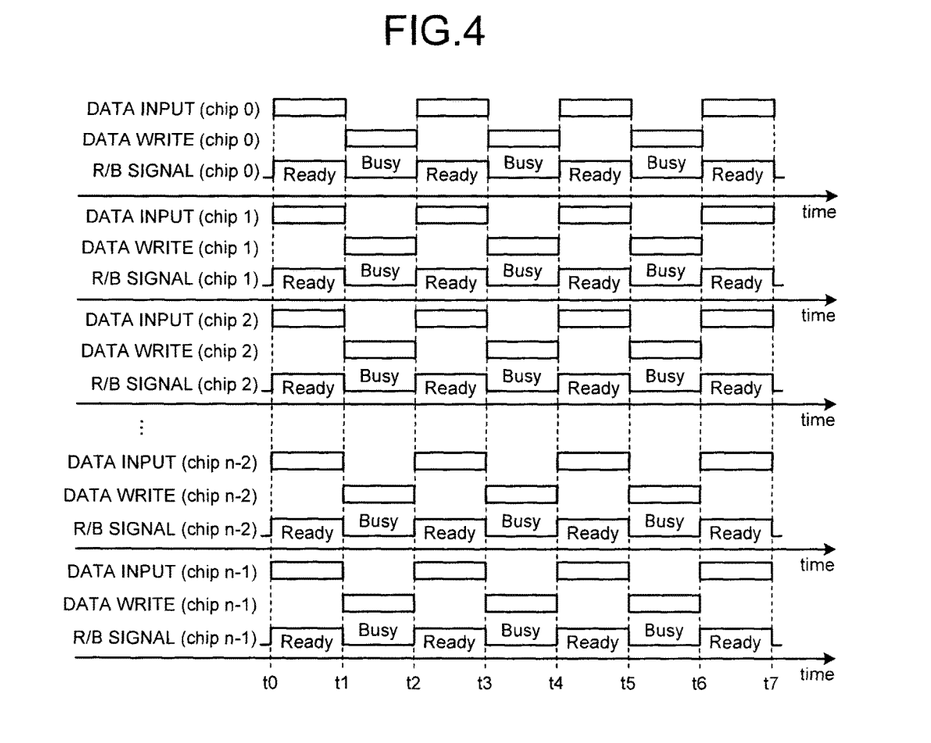
FIG. 4 is a timing chart illustrating the parallel control according to the first embodiment.

Next, parallel control will be explained using FIGS. 3 and 4. FIG. 3 is a diagram conceptually illustrating parallel control and illustrates a state in which data (external data) transferred from the control device 200 is transferred to each chip. In addition, FIG. 4 is a basic timing chart of parallel control and illustrates data input, data write, and a Ready/Busy (R/B) signal for each chip. Note that the number (n) of chips in FIGS. 3 and 4 are n=4 in the present embodiment, and chip0 to chip n−1 (=3) correspond to reference signs 140 to 143 in FIG. 1, respectively.

As illustrated in FIG. 3, in parallel control, data transferred from the control device 200 is divided into a plurality of data units, and the data units are inputted and simultaneously written to the plurality of chips. Therefore, in the parallel control, the processing speed is faster compared to that of normal control which will be described later.

Specifically, each chip temporarily stores inputted data in the data cache (FIG. 2) (the data cache (RAM) can store data in byte units). Then, one-page data is inputted to each chip and stored in the data cache. Then, the data is programmed in memory cells.

Note that the divided data units are transferred in parallel to the chip0 to the chip n−1, but the transfer start timings do not need to be completely the same between the chips and some time difference is allowable. Note also that the transfer end timings do not need to be completely the same, either, and some time difference is allowable. Note, however, that there is a need of a time period during which the memory data buses 170 to 173 simultaneously transfer data to the plurality of chips.

As illustrated in FIG. 4, during a period from time t0 to time t1, the memory controller 110 starts data input to the chip0 to the chip n−1 where data is to be written, at substantially the same timing and ends the data input substantially simultaneously. At this time, since each of the chip0 to the chip n−1 is in an accessible state (data receivable state), i.e., a Ready state, each Ready/Busy signal line outputs a High-level (also simply written as H) R/B signal. In addition, during the data input period, the memory data buses 170 to 173 transfer data simultaneously and parallelly.

Then, at time t1, the MPU 118 of the memory controller 110 issues a write instruction (10H). In response to this, during a period from time t1 to time t2, each of the chip0 to the chip n−1 writes (programs) the data to memory cells. During this period, each of the chip0 to the chip n−1 is in an access forbidden state (a state in which data reception is forbidden), i.e., a Busy state. Hence, each Ready/Busy signal line outputs a Low-level (also simply written as L) R/B signal. Note that in the following the period from the start to the end of programming is called Busy time. In the present embodiment, for simplicity, the Busy time is equal to the programming time of the chips.

Then, when the programming is completed in each of the chip0 to the chip n−1, each of the chip0 to the chip n−1 returns to a Ready state. Thus, during a period from time t2 to time t3, the memory controller 110 performs data input to each of the chip0 to the chip n-1. Specifically, the Ready/Busy lines 160 to 163 simultaneously output H R/B signals, and the memory data buses 170 to 173 simultaneously transmit data. Thereafter, programming and data input are repeated in the same manner.

Next, normal control will be explained using FIG. 5. In the normal control, the access speed is slower compared to that of the above-described parallel control.

Figure 5:
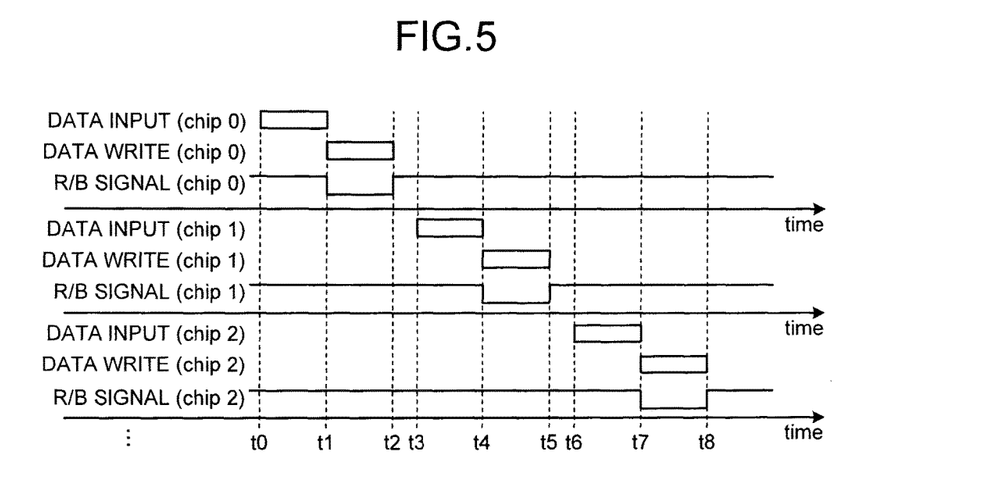
FIG. 5 is a timing chart illustrating normal control according to the first embodiment.

As illustrated in FIG. 5, during a period from time t0 to time t1, the memory controller 110 performs data input to the chip0 (140) where data is to be written. At this time, since each of the chip0 to the chip n-1 is in an accessible state, the Ready/Busy signal line 160 outputs an H signal. The memory data bus 170 transmits data to the chip0. Other memory data buses 171 to 173 do not transmit data. Subsequently, during a period from time t1 to time t2, the chip0 writes the inputted data. Hence, the Ready/Busy signal line 160 outputs an L signal. Thereafter, during a period from time t2 to time t3, the memory controller 110 is on standby. During this period, the memory data buses 170 to 173 do not transmit data to the chip0 to the chip3. In addition, the chip0 to the chip3 do not write data to memory cells. Thereafter, during a period from time t3 to t4, the memory data bus 171 transmits data to the chip1. Then, during a period from time t4 to time t5, the chip1 writes the inputted data. The same is performed for subsequent chips.

In such normal control, after completing writing to a certain chip, data input to the next chip starts and thus access is slow. Note, however, that since one or less chip operates during each time period, the current consumption can be reduced. In addition, since one or less memory bus transmits data during each time period, the current consumption can be reduced.

Note that the setting with no standby time (t2 to t3) may also be possible.

Next, a memory temperature control process will be explained that protects various types of information such as programs and data stored in the memory unit 130 of the information processing device 1 of the present embodiment, from being corrupted due to a temperature increase.

As illustrated in FIG. 1, the MPU 118 of the memory controller 110 operates according to the control program stored in the ROM 120 or the memory unit 130, and is thereby provided with the temperature information receiver 127, the gradient determining unit 128, and the temperature controller 129, as function units.

The temperature information receiver 127 receives, for example, temperature information measured by the temperature measuring circuit (the temperature measuring circuit 124, the second temperature measuring circuit).

The gradient determining unit 128 determines a gradient related to a temperature increase, based on the temperature information about a plurality of temperatures which is received by the temperature information receiver 127.

The temperature controller 129 performs temperature control to protect various types of information stored in the memory unit 130 from being corrupted due to a temperature increase, according to a gradient determination result obtained by the gradient determining unit 128.

On the other hand, as illustrated in FIG. 1, the control device 200 operates according to a program stored in the ROM or the memory system 100, and is thereby provided with a receiver 211 and a temperature processor 212, as function units.

The receiver 211 receives the gradient determination result from the memory controller 110 that controls data processing performed on the memory unit 130 and that determines a gradient related to a temperature increase, based on temperature information about a plurality of temperatures.

Based on the gradient determination result received by the receiver 211, the temperature processor 212 allows the memory unit 130 and the memory controller 110 to perform the process of protecting various types of information such as programs and data stored in the memory unit 130 from being corrupted due to a temperature increase.

Figure 6:
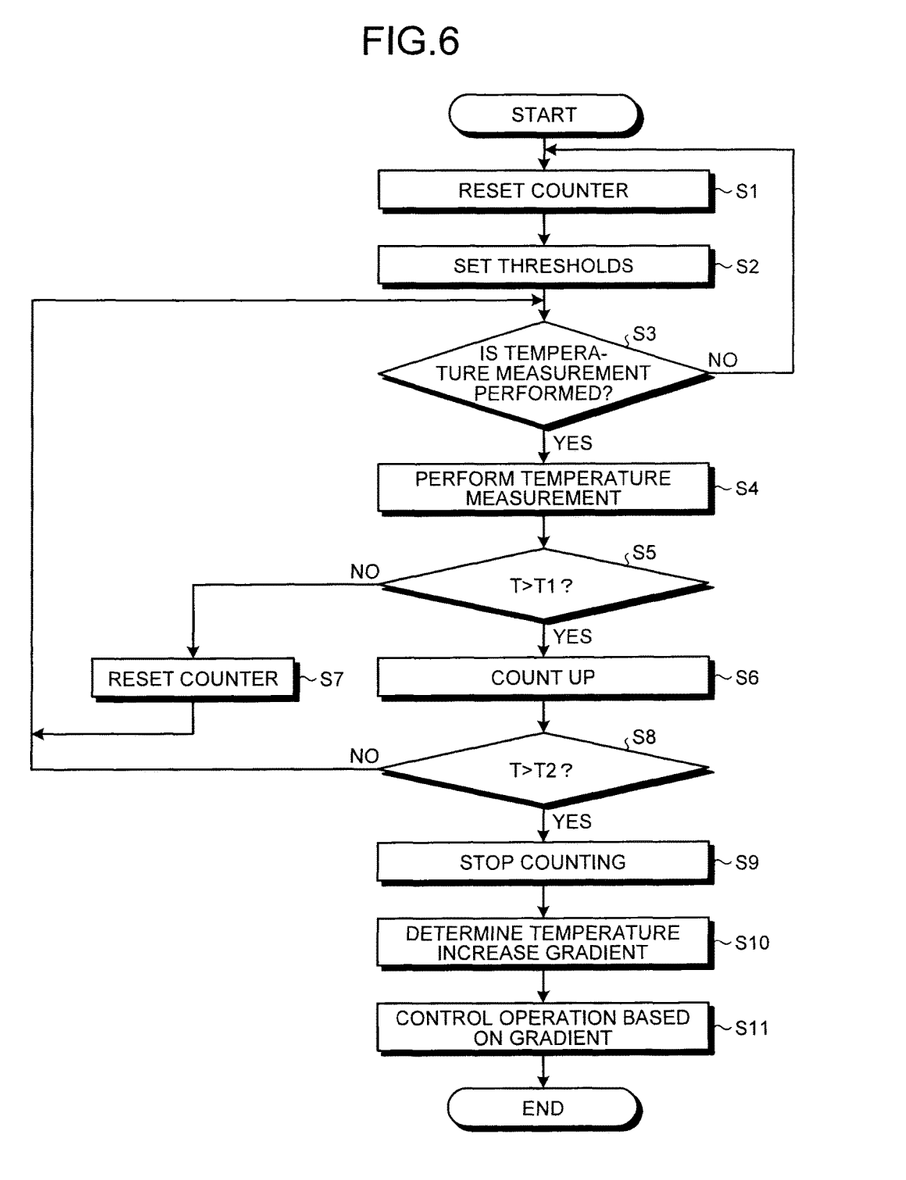
FIG. 6 is a flowchart schematically illustrating the flow of a memory temperature control process according to the first embodiment.

Here, FIG. 6 is a flowchart schematically illustrating the flow of a memory temperature control process. As illustrated in FIG. 6, for example, after power is turned on, the MPU 118 resets the counter C for temperature gradient determination (S1) and sets first temperature threshold data T1 and second temperature threshold data T2 in the RAM 122 (S2).

Note that although in the present embodiment the first temperature threshold data T1 and the second temperature threshold data T2 are set, the configuration is not limited thereto. As long as a temperature gradient, i.e., the manner in which the temperature increases, can be viewed, there may be the settings of two or more temperature thresholds.

In addition, although in the present embodiment a temperature increase gradient is detected according to the interval between times when each temperature information about a plurality of temperatures is reached (the number of counts), the configuration is not limited thereto. For example, a temperature increase gradient may be detected based on the width between pieces of temperature information (the difference between a maximum value and a minimum value) within a certain period of time.

Thereafter, if the MPU 118 (temperature information receiver 127) performs temperature measurement (Yes at S3), the MPU 118 (temperature information receiver 127) receives temperature information from the temperature measuring circuit (the temperature measuring circuit 124, the second temperature measuring circuit) and performs temperature measurement (S4).

Here, when temperature measurement is performed is not only when power is turned on, but also, for example, when ECC code is decoded. The memory temperature control process does not need to be performed at all times, but may be performed upon a process where the temperature increases due to heat generation in a circuit, etc.

On the other hand, if the MPU 118 (temperature information receiver 127) does not need to perform temperature measurement (No at S3), the MPU 118 (temperature information receiver 127) returns to S1.

Note that, when, as described above, the second temperature measuring circuit is mounted on the first main surface (front surface) of the substrate where the memory unit 130 is mounted, the MPU 118 utilizes information obtained from the two temperature measuring circuits, for memory control. For example, control may be performed using a value obtained by averaging temperature values (or numerical values that reflect temperatures) which are obtained from the two temperature measuring circuits. Alternatively, the configuration may be such that temperature values are independently determined, and when either temperature information exceeds a threshold, control is performed.

If an ambient temperature T of the memory unit 130 or the memory controller 110 measured by the temperature measuring circuit (the temperature measuring circuit 124, the second temperature measuring circuit) exceeds the first temperature threshold data T1 (Yes at S5), the MPU 118 (gradient determining unit 128) counts up the counter value of the counter C for temperature gradient determination (S6) and proceeds to the next S8.

On the other hand, if the ambient temperature T of the memory unit 130 or the memory controller 110 measured by the temperature measuring circuit (the temperature measuring circuit 124, the second temperature measuring circuit) does not exceed the first temperature threshold data T1 (No at S5), the MPU 118 (gradient determining unit 128) resets the counter C for temperature gradient determination (S7) and returns to S3. By thus resetting the counter C for temperature gradient determination, when, after exceeding the first temperature threshold data T1, the temperature T transitions around the first temperature threshold data T1 without reaching the second temperature threshold data T2 (T2>T1) and thereafter the temperature T suddenly increases to the second temperature threshold data T2, the gradient is not determined to be gentle.

Note that S7 where the counter C for temperature gradient determination is reset may not be provided and thus if the temperature T does not exceed the first temperature threshold data T1 (No at S5), processing may directly return to S3.

In addition, after the MPU 118 (gradient determining unit 128) counts up at S6, if the ambient temperature T of the memory unit 130 or the memory controller 110 measured at S4 by the temperature measuring circuit (the temperature measuring circuit 124, the second temperature measuring circuit) does not exceed the second temperature threshold data T2 (No at S8), the MPU 118 (gradient determining unit 128) returns to S3.

In addition, if the ambient temperature T of the memory unit 130 or the memory controller 110 measured at S4 by the temperature measuring circuit (the temperature measuring circuit 124, the second temperature measuring circuit) exceeds the second temperature threshold data T2 (Yes at S8), the MPU 118 (gradient determining unit 128) stops counting of the counter value of the counter C for temperature gradient determination (S9), and determines a temperature increase gradient from the counter value of the counter C for temperature gradient determination (S10).

Namely, in the present embodiment, after exceeding the first temperature threshold data T1, in order to verify whether the temperature T has exceeded the second temperature threshold data T2 (T2>T1), the counter value is increased by a predetermined value (e.g., 1) every time temperature measurement is performed. In this case, unless the intervals at which temperature measurement is performed are determined to some extent, an effective temperature gradient cannot be obtained. Therefore, in the present embodiment, the timing at which temperature measurement at S4 is performed is set to a predetermined interval at which an effective temperature gradient can be obtained.

Note that, regardless of the timing of performing, after exceeding the first temperature threshold data T1, temperature measurement for verifying whether the temperature T has exceeded the next second temperature threshold data T2 (T2>T1), counting-up of the counter value of the counter C for temperature gradient determination may be proceeded with time.

Note that an ambient temperature T of the memory unit 130 or the memory controller 110 again measured by the temperature measuring circuit (the temperature measuring circuit 124, the second temperature measuring circuit), between S6 and S8, may be the measured temperature T to determine exceeds the second temperature threshold data T2.

Subsequently, the MPU 118 (temperature controller 129) controls operation, based on the temperature increase gradient determined at S10 (S11). Here, the temperature increase gradient is determined by a value obtained by dividing a temperature difference (T2−T1) by time (or a value proportional to time) which is determined by the counter value counted during a period after exceeding the first temperature threshold data T1 and before exceeding the next second temperature threshold data T2 (T2>T1). Note that a "determination of a gradient" does not necessarily require the determining of a value obtained by dividing the temperature difference by time (or a value proportional to time). A "determination of a gradient" may be made according to a comparison in magnitude between the counter value and a predetermined reference value. Specifically, when the counter value is smaller than the reference value, it is determined that the temperature increase gradient is steep (greater than or equal to a certain gradient).

For example, it can be determined that there is a sudden temperature increase when the temperature increase gradient is steep (greater than or equal to the certain gradient). Thus, the MPU 118 can see that urgent action needs to be taken. In such a case, the MPU 118 (temperature controller 129) stops the memory control operation (e.g., stops the operation of the memory data buses 170 to 173 and the writing to the memory within the memory unit 130).

In addition, for example, when it is determined that there is a mild temperature increase (less than or equal to the certain gradient), the MPU 118 (temperature controller 129) suppresses the number of parallel processes performed during parallel control (program/read/erase) where transferred data is divided into a plurality of data units and the data units are simultaneously written to the plurality of chips of the memory unit 130.

In addition, for example, when it is determined that there is a mild temperature increase (less than or equal to the certain gradient), the MPU 118 (temperature controller 129) switches the parallel control to the normal control to suppress the temperature increase. This is performed because, while the parallel control has high current consumption per unit time and thus the temperature of the memory unit 130 increases, by switching to the normal control the current consumption can be reduced.

Note that the parallel control may be switched to interleaved control. The interleaved control is control where during a period during which writing of data to memory cells in one memory is performed (during Busy time of one memory), data input to the other memory starts, by which the Busy time is reduced, enabling high-speed access. By switching the parallel control to the interleaved control, too, the current consumption can be reduced.

In addition, the MPU 118 (temperature controller 129) may change the clock frequency (internal clock) of the MPU 118 which is used for the internal processes of the memory controller 110, based on the temperature increase gradient determined at S10.

Note that the MPU 118 resumes the original memory control operation when an ambient temperature T of the memory unit 130 or the memory controller 110 measured by the temperature measuring circuit (the temperature measuring circuit 124, the second temperature measuring circuit) no longer exceeds the first temperature threshold data T1 after performing the operation control based on the temperature increase gradient at S11. When the original memory control operation is thus resumed, too, the MPU 118 performs the control process at and after S1.

According to the first embodiment, the gradient determining unit 128 determines a gradient related to a temperature increase, based on temperature information about a plurality of temperatures which is received by the temperature information receiver 127. According to a gradient determination result obtained by the gradient determining unit 128, the temperature controller 129 performs a memory temperature control process (stopping of memory control operation, suppression of the number of parallel processes, switching of control, etc.). By this, various types of information stored in the memory unit 130 are protected from being corrupted due to a temperature increase. As a result, an effect can be obtained that a failure in system operation due to a temperature increase is prevented, enabling to prevent the breakdown of memory cells and peripheral circuits.

Note that, when the temperature measuring circuit is provided at a position distanced from a location where a temperature needs to be measured, there is an error between a temperature T measured by the temperature measuring circuit (the temperature measuring circuit 124, the second temperature measuring circuit) and the actual temperature of the location where a temperature needs to be measured. It is desirable to adjust and set the first temperature threshold data T1, the second temperature threshold data T2, etc., taking into account the error. In addition, the ambient temperature T, the first temperature threshold data T1, the second temperature threshold data T2, etc., do not need to be a temperature itself, and may be a numerical value or information that reflects a temperature.

In addition, although temperature information is obtained using the temperature measuring circuit (the temperature measuring circuit 124, the second temperature measuring circuit) provided around the memory controller 110 or the memory unit 130, instead of that, temperature information can be obtained from the side of the control device 200. For example, when the control device 200 includes a temperature sensor, temperature information T (or data that changes according to the temperature, etc.) may be obtained from the control device 200 through the interface unit 112. In this case, updated temperature information T is obtained through the interface unit 112 periodically every predetermined period. In addition, it is also possible to configure to obtain first temperature threshold data T1 and second temperature threshold data T2 which are thresholds, from the control device 200. In addition, when the component A 201, the component B 202, and the component C 203 include temperature sensors, the control device 200 may obtain temperature information T (or data that changes according to the temperature, etc.) from each of the temperature sensors and provide the temperature information T to the memory controller 110.

In addition, it is also possible that a temperature measuring circuit is formed on the same semiconductor substrate as that having thereon the four chips 140 to 143 forming a NAND flash memory, and temperature information is obtained from the temperature measuring circuit. For example, a silicon diode composed of a PN junction circuit element can be formed. Since the silicon diode has a temperature drift characteristic, the voltage on the anode side drops with an increase in ambient temperature. Thus, this voltage change can be obtained as temperature information.

Second Embodiment

Next, a second embodiment will be explained based on the drawings. Note that the same portions as those of the above-described first embodiment are denoted by the same reference signs and explanation thereof is also omitted. In the first embodiment, memory operation is controlled based on a temperature increase gradient. In the present embodiment, based on a temperature increase gradient, the temperature increase gradient is notified to an external device.

Figure 7:
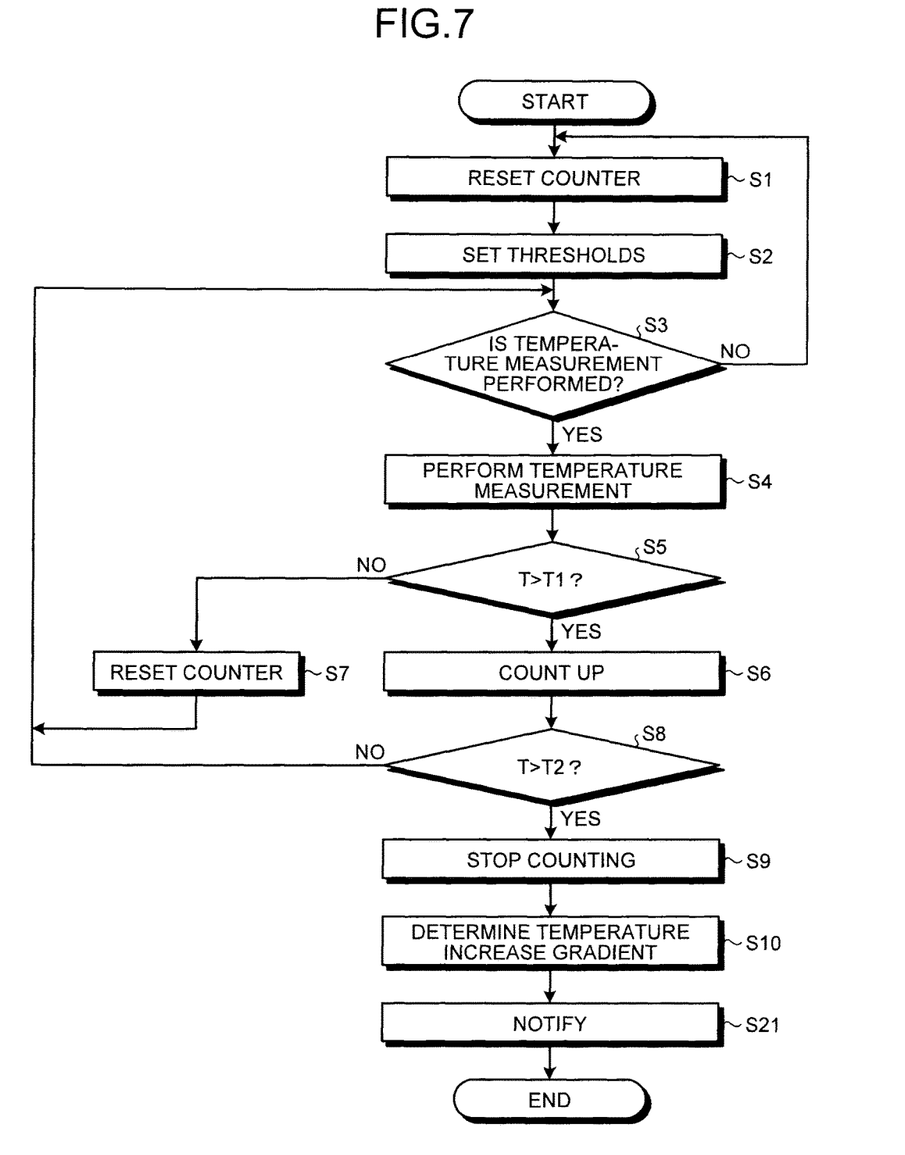
FIG. 7 is a flowchart schematically illustrating the flow of a memory temperature control process according to a second embodiment.

Here, FIG. 7 is a flowchart schematically illustrating the flow of a memory temperature control process according to the second embodiment. As illustrated in FIG. 7, for example, after power is turned on, an MPU 118 performs processes at S1 to S10 in the same manner as in the first embodiment.

Then, the MPU 118 (temperature controller 129) notifies an external device (e.g., a control device 200) of information generated based on a temperature increase gradient determined at S10 (gradient determination result) (S21).

On the other hand, a receiver 211 of the control device 200 receives the gradient determination result from a memory controller 110. Then, based on the gradient determination result received by the receiver 211, a temperature processor 212 of the control device 200 allows a memory unit 130 and the memory controller 110 to perform the process of protecting various types of information such as programs and data stored in the memory unit 130 from being corrupted due to a temperature increase.

For example, the temperature processor 212 of the control device 200 suppresses data access based on the temperature increase gradient, or changes the operating rate by changing the clock frequency (operating frequency) of the memory controller 110. Here, the clock frequency (operating frequency) of the memory controller 110 is a reference clock used for data transfer with the control device 200. By thus changing the clock frequency (operating frequency) of the memory controller 110 based on the temperature increase gradient, the data transfer rate between the control device 200 and a memory system 100 can be changed.

According to the second embodiment, based on a temperature increase gradient, the temperature increase gradient is notified to an external device. As a result, the external device having received the notification suppresses data access based on the temperature increase gradient, or changes the operating rate by changing the frequency of the memory controller 110. By this, an effect can be obtained that a failure in system operation due to a temperature increase is prevented, enabling to prevent the breakdown of memory cells and peripheral circuits.

Note that, when, in the case of a component A 201, a component B 202, and a component C 203 configured to be able to transmit a similar gradient determination result to that obtained by the memory controller 110, the control device 200 which is an external device receives gradient determination results from the component A 201, the component B 202, and the component C 203, the control device 200 can also suppress data access against each component based on the gradient determination results.

In addition, there is a possibility that a component provided close to the memory system 100 may be a large heat source relative to the memory system 100, and heat generated from the component may be transmitted to the memory system 100, and accordingly, the operation of the memory system 100 may fail. In this case, data access to the component from the control device 200 may be suppressed or the control device 200 may issue an instruction to the component to control internal operation, so as to reduce the current consumption of the component based on a gradient determination result received from the memory system 100 instead of receiving a gradient determination result from the component.

Third Embodiment

Next, a third embodiment will be explained based on the drawings. Note that the same portions as those of the above-described first embodiment or second embodiment are denoted by the same reference signs and explanation thereof is also omitted. In the present embodiment, in addition to the processes of the first embodiment or the second embodiment, necessary data is evacuated to a nonvolatile area according to a temperature increase gradient, which differs from the first embodiment and the second embodiment.

Figure 8:
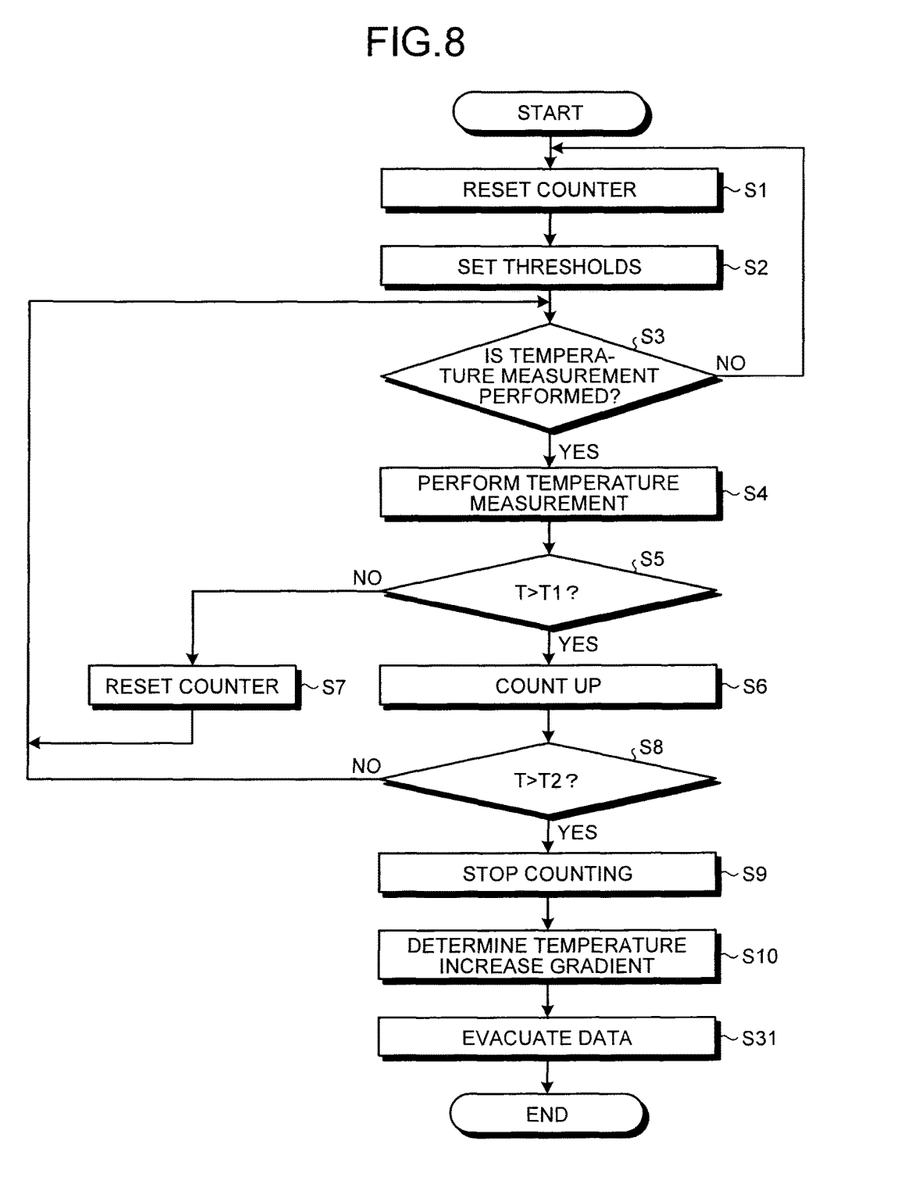
FIG. 8 is a flowchart schematically illustrating the flow of a memory temperature control process according to a third embodiment.

Here, FIG. 8 is a flowchart schematically illustrating the flow of a memory temperature control process according to the third embodiment. As illustrated in FIG. 8, for example, after power is turned on, an MPU 118 performs processes at S1 to S10 in the same manner as in the first embodiment or the second embodiment.

Then, the MPU 118 (temperature controller 129) evacuates necessary data to a nonvolatile area, according to a temperature increase gradient determined at S10 (S31).

For example, it can be determined that there is a sudden temperature increase when the temperature increase gradient is steep. Thus, the MPU 118 can see that urgent action needs to be taken. In such a case, the MPU 118 (temperature controller 129) evacuates information stored in a memory unit 130 to a flash memory of a control device 200.

According to the third embodiment, necessary data is evacuated to the nonvolatile area, according to a temperature increase gradient. As a result, even in the event of the occurrence of a failure in system operation due to a temperature increase, data can be protected. Thus, an effect that a certain degree of recovery can be expected can be obtained.

Note that although in the present embodiment the MPU 118 (temperature controller 129) independently performs the process of evacuating information stored in the memory unit 130 to the flash memory of the control device 200, the configuration is not limited thereto. The MPU 118 (temperature controller 129) may perform the evacuation process together with the processes of the MPU 118 (temperature controller 129) of the first embodiment or the second embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a semiconductor memory;
a memory controller configured to control writing and reading of information to and from the semiconductor memory;
a temperature information receiver configured to receive temperature information, the temperature information receiver being provided in the memory controller;
a gradient determining circuit provided in the memory controller, the gradient determining circuit being configured to:
detect a first timing and a second timing, the first timing being a timing at which the temperature information received by the temperature information receiver exceeds a first threshold, the second timing being a timing at which the temperature information received by the temperature information receiver exceeds a second threshold without the temperature information received by the temperature information receiver being equal to or less than the first threshold, the second threshold being higher than the first threshold;
calculate, from time difference between the first timing and the second timing, steepness of a temperature increase using a counter which starts counting after the temperature information exceeds the first threshold and stops counting when the temperature information reaches the second threshold and resets the counting when the temperature information becomes equal to or less than the first threshold; and
determine a gradient related to the steepness of the temperature increase of at least one of the semiconductor memory and the memory controller; and
a temperature controller configured to perform a control operation to suppress the temperature increase based on a comparison of the gradient determined by the gradient determining circuit with a predetermined temperature gradient.

2. The memory system according to claim 1, wherein the temperature controller is configured to stop memory control operation performed on the semiconductor memory, in case the gradient determined by the gradient determining circuit is greater than or equal to the predetermined temperature gradient.

3. The memory system according to claim 1, wherein the temperature controller is configured to suppress, in case the gradient determined by the gradient determining circuit is less than or equal to the predetermined temperature gradient, the number of parallel processes performed during parallel control in which the memory controller divides transferred information into pieces of information and writes the pieces of divided information to a plurality of chips of the semiconductor memory simultaneously.

4. The memory system according to claim 1, wherein the temperature controller is configured to switch parallel control to normal control, in case the gradient determined by the gradient determining circuit is less than or equal to the predetermined temperature gradient, the parallel control indicating control in which the memory controller divides transferred information into pieces of information and simultaneously writes the pieces of divided information to a plurality of chips of the semiconductor memory, the normal control indicating control in which the memory controller, after completing writing of transferred information to one chip of the semiconductor memory, writing to another chip starts.

5. The memory system according to claim 1, wherein the temperature controller is configured to notify a control device of the gradient determined by the gradient determining circuit, and allow the control device to perform a process of suppressing the temperature increase based on a result of the gradient determination, the control device performing overall control of an entire device where the memory system is mounted.

6. The memory system according to claim 1, wherein the temperature controller is configured to evacuate information stored in the semiconductor memory to a nonvolatile area, according to the gradient determined by the gradient determining circuit.

7. The memory system according to claim 1, further comprising a temperature measuring circuit configured to measure an ambient temperature of at least one of the semiconductor memory and the memory controller, wherein the temperature information receiver receives the temperature information about a plurality of temperatures measured by the temperature measuring circuit.

8. The memory system according to claim 7,
wherein the semiconductor memory is mounted on a first surface of a substrate and the memory controller is mounted on a second surface of the substrate, and
wherein the temperature measuring circuit is provided on both of the surfaces of the substrate.

9. The memory system according to claim 7,
wherein the semiconductor memory and the memory controller are mounted on one surface of a substrate, and
wherein the temperature measuring circuit is provided within the memory controller.

10. The memory system according to claim 1, wherein the temperature information receiver receives the temperature information about a plurality of temperatures measured by a temperature sensor communicatively coupled to the system.

11. A memory controller comprising:
a controller configured to control a program of writing information to a semiconductor memory;
a temperature information receiver configured to receive ambient temperature information of the semiconductor memory;
a gradient determining circuit configured to:
detect a first timing and a second timing, the first timing being a timing at which the temperature information received by the temperature information receiver exceeds a first threshold, the second timing being a timing at which the temperature information received by the temperature information receiver exceeds a second threshold without the temperature information received by the temperature information receiver being equal to or less than the first threshold, the second threshold being higher than the first threshold;
calculate, from time difference between the first timing and the second timing, steepness of a temperature increase using a counter which starts counting after the temperature information exceeds the first threshold and stops counting when the temperature information reaches the second threshold and resets the counting when the temperature information becomes equal to or less than the first threshold; and
determine a gradient related to the steepness of the temperature increase of the semiconductor memory; and
a temperature controller configured to perform a control operation to suppress the temperature increase based on the comparison of the gradient determined by the gradient determining circuit with a predetermined temperature gradient.

12. The memory controller according to claim 11, wherein the temperature controller is configured to stop memory control operation performed on the semiconductor memory, in case the gradient determined by the gradient determining circuit is greater than or equal to the predetermined temperature gradient.

13. The memory controller according to claim 11, wherein the temperature controller is configured to suppress, in case the gradient determined by the gradient determining circuit is less than or equal to the predetermined temperature gradient, the number of parallel processes performed during parallel control in which the memory controller divides transferred information into pieces of information and writes the pieces of divided information to a plurality of chips of the semiconductor memory simultaneously.

14. The memory controller according to claim 11, wherein the temperature controller is configured to switch parallel control to normal control in case the gradient determined by the gradient determining circuit is less than or equal to the predetermined temperature gradient, the parallel control indicating control in which the memory controller divides transferred information into pieces of information and simultaneously writes the pieces of divided information to a plurality of chips of the semiconductor memory, the normal control indicating control in which the memory controller, after completing writing of transferred information to one chip of the semiconductor memory, writing to another chip starts.

15. The memory controller according to claim 11, wherein the temperature controller is configured to notify a control device of the gradient determined by the gradient determining circuit, and allow the control device to perform a process of suppressing the temperature increase based on a result of the gradient determination, the control device performing overall control of an entire device where the memory controller is mounted.

16. The memory controller according to claim 11, wherein the temperature controller is configured to evacuate information stored in the semiconductor memory to a nonvolatile area, according to the gradient determined by the gradient determining circuit.

17. The memory controller according to claim 11, further comprising a temperature measuring circuit configured to measure an ambient temperature of the memory controller and the semiconductor memory,
wherein the temperature information receiver receives the temperature information about a plurality of temperatures measured by the temperature measuring circuit.

18. The memory controller according to claim 11, wherein the temperature information receiver receives the temperature information about a plurality of temperatures measured by a temperature sensor communicatively coupled to the memory controller.

19. A control device comprising:
a receiver configured to receive a gradient from a memory controller, the memory controller being configured to:
control writing and reading of information to and from a semiconductor memory;
detect a first timing and a second timing, the first timing being a timing at which the temperature information received by the temperature information receiver exceeds a first threshold, the second timing being a timing at which the temperature information received by the temperature information receiver exceeds a second threshold without the temperature information received by the temperature information receiver being equal to or less than the first threshold, the second threshold being higher than the first threshold;
calculate, from time difference between the first timing and the second timing, steepness of a temperature increase using a counter which starts counting after the temperature information exceeds the first threshold and stops counting when the temperature information reaches the second threshold and resets the counting when the temperature information becomes equal to or less than the first threshold; and
determine a gradient related to the steepness of the temperature increase of at least one of the semiconductor memory and the memory controller; and a temperature processor configured to allow the semiconductor memory and the memory controller to perform a process of protecting various types of information stored in the semiconductor memory from being corrupted due to the temperature increase, based on the comparison of the determined gradient received by the receiver with a predetermined temperature gradient.

20. The control device according to claim 19, wherein the temperature processor suppresses access to the semiconductor memory, based on the gradient.

* * * * *